UNITED STATES PATENT OFFICE.

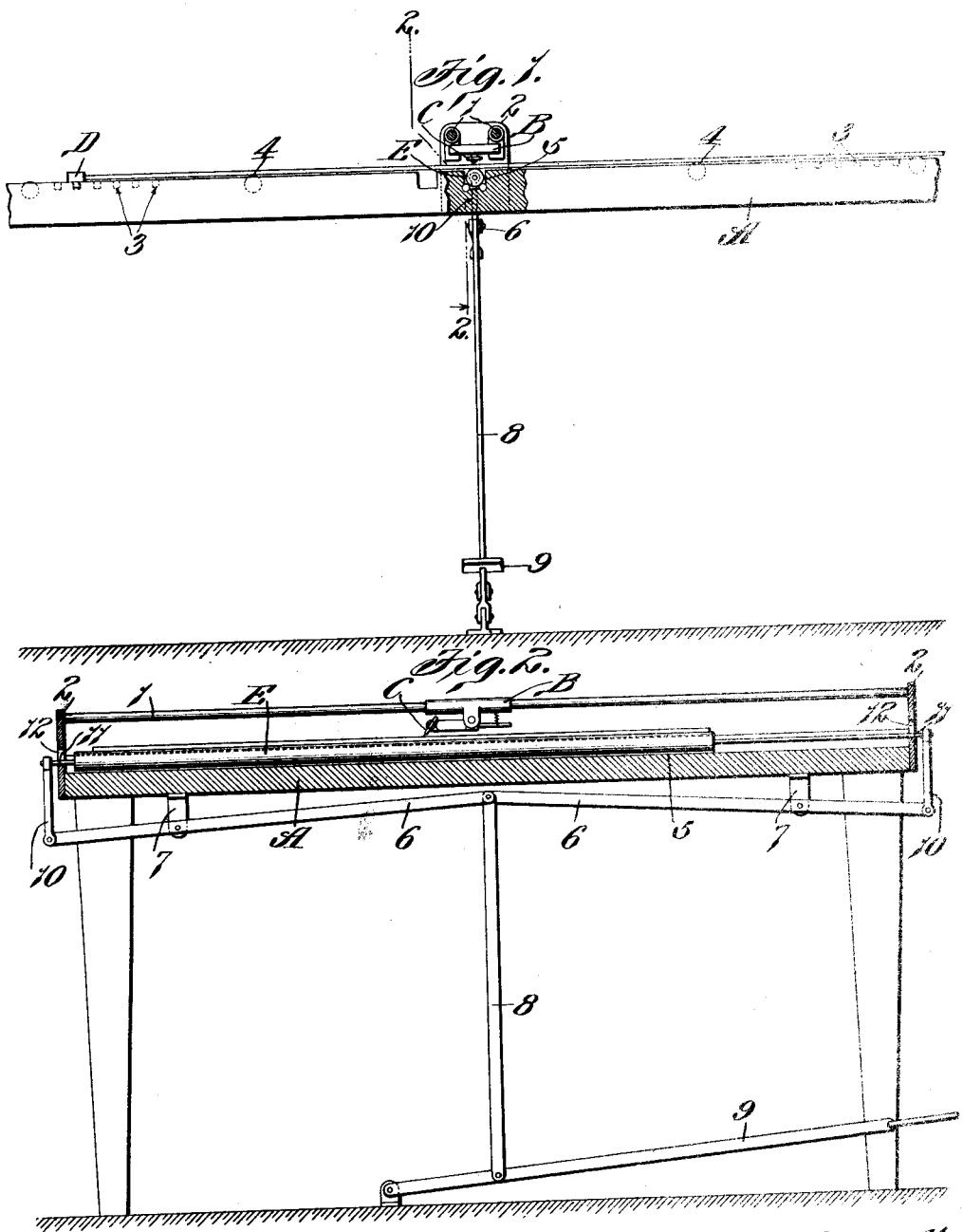

ALLAN P. WHITTEMORE, OF WEBSTER GROVES, MISSOURI.

SHEET-GLASS-CUTTING MACHINE.

1,117,736. Specification of Letters Patent. Patented Nov. 17, 1914.

Application filed March 25, 1913. Serial No. 756,647.

*To all whom it may concern:*

Be it known that I, ALLAN P. WHITTEMORE, a citizen of the United States, residing at Webster Groves, Missouri, have invented a certain new and useful Improvement in Sheet-Glass-Cutting Machines, of which the following is a full, clear, and exact description, such as will enable others skilled in the art to which it appertains to make and use the same.

This invention relates to machines for cutting sheets of glass.

One object of my invention is to provide a sheet glass cutting machine in which the cutting or scoring tool is mounted on a carriage that always travels in the same path across the work-table, and the gage, against which one edge of the glass is held while it is being cut, is adjustable toward and away from the path of travel of the carriage.

Another object is to provide a glass cutting machine in which the work-table is equipped with a movable member, under control of the operator, that is adapted to be moved upwardly after the glass has been scored or scratched so as to break the glass at the point where the top surface of the glass is scored, said movable member being preferably located in longitudinal alinement with the path of travel of the scoring tool on the carriage.

Other objects and desirable features of my invention will be hereinafter pointed out.

Figure 1 of the drawings is an end elevational view of a sheet glass cutting machine constructed in accordance with my invention, the work-table being broken away so as to show the location of the movable member that is used for breaking the glass at the point where it is scored; and Fig. 2 is a vertical sectional view taken on approximately the line 2—2 of Fig. 1.

Referring to the drawings which illustrate the preferred form of my invention, A designates the work-table of the machine, and B designates a carriage that is slidingly mounted on a pair of guide rods 1 that are supported by end plates 2 on the work-table, the carriage B being provided with a tool C of any suitable type for scoring or scratching the top surface of the glass. The carriage B always travels in the same path and the variation in the size of the sheets of glass cut in the machine is obtained by means of an adjustable gage D that can be adjusted toward and away from the path of travel of the carriage, said gage D forming an abutment against which one edge of the glass bears during the cutting or scoring operation. The gage D herein shown consists of a bar or straight edge arranged parallel to the guide rods 1 and provided with pins that coöperate with recesses 3 in the top surface of the work-table that are located different distances from the path of travel of the carriage B, but it will, of course, be understood that it is immaterial so far as my invention is concerned what particular type of gage the machine is provided with so long as it can be adjusted laterally toward and away from the carriage.

In order that the glass may be broken evenly on the line where the top surface of the glass is scored or scratched by the tool C, I have provided the work-table A with a movable member E which the operator moves upwardly or vertically with relation to the work-table so as to exert upward pressure on the glass adjacent the point where it is scored. The work-table is preferably provided with longitudinally disposed rollers 4 on which the glass rests while it is being cut or scored, and in the preferred form of my invention, as herein shown, the vertically movable member E consists of a roller that extends parallel to the rollers 4. This roller E is arranged directly underneath the scoring tool C on the carriage B, in a groove 5 in the top surface of the work-table so that when it is actuated by the operator it will exert upward pressure on the glass at the exact point where the glass is scored. Any suitable mechanism may be used for moving the roller E upwardly. The mechanism herein shown for this purpose consists of a pair of toggle levers 6 pivotally mounted in brackets 7 on the under side of the work-table and having their inner ends joined to a link 8 which is pivotally connected to a foot-treadle 9, there being sufficient play in the pivotal connections between the link 8 and the toggle levers 6 to permit said parts to move with relation to each other without binding or bending. The outer ends of the toggle levers 6 are pivotally connected to bearing members 10 that receive trunnions 11 on the ends of the roller E, and said roller is guided vertically by the end plates 2 on the work-table which are provided with vertically disposed slots 12 through which said trunnions pass. After the operator has moved the carriage B across the work-table so as to cause the tool C to score the glass, he actuates the treadle 9 so as to move the roller E upwardly, thereby breaking the glass evenly on the line or scratch that the tool C forms in the top surface of the glass.

With a machine of the construction above-described an unskilled operator can cut sheet glass quickly and accurately owing to the fact that the scoring tool is mounted in a carriage which always moves in the same path across the work-table. The machine can be adjusted easily to cut sheets of different dimensions by simply changing the position of the gage D, and still another desirable feature of such a machine is that a perfectly even break is insured along the line where the top surface of the glass is scored owing to the fact that the work-table is equipped with a vertically movable member under control of the operator that is located directly under the path of travel of the scoring tool. Said vertically movable member can be actuated easily by the foot of the operator thus giving the operator the use of both hands to handle the glass on the table, and as the machine comprises only a few parts of simple design it can be manufactured at a low cost.

Having thus described my invention, what I claim as new and desire to secure by Letters Patent is:

1. In a sheet glass cutting machine, a work-table on which the glass is positioned while it is being scored, a member in said work-table arranged in such a position that it will lie directly under the point where the glass is scored, and means for moving said member upwardly so as to exert sufficient pressure on the glass to break it along the line where it is scored.

2. In a sheet glass cutting machine, a work-table on which the glass rests while it is being scored, a rotatable member in the top face of said work-table that supports the glass and facilitates the movement of the sheet of glass over the table said member being arranged in such a position that it will lie directly under the point where the sheet is scored, and means for moving said member upwardly with relation to the table so as to exert sufficient pressure on the under side of the sheet to break it along the line where the top face of same is scored.

3. In a sheet glass cutting machine, a work-table, a carriage arranged to travel in a straight path over said table and provided with a tool for scoring or scratching the top surface of the sheet of glass, a member in said work-table arranged beneath the path of the scoring tool, and means for moving said member upwardly so as to exert sufficient pressure on the glass to break it along the line where it is scored.

4. In a sheet glass cutting machine, a work-table, a carriage arranged to travel in a straight path above the work-table and provided with a tool for scoring or scratching the top surface of the glass, a roller arranged in the top surface of said table beneath the path of the scoring tool, and means for moving said roller upwardly with relation to the table so as to cause the glass to break along the line where it is scored.

5. In a machine for cutting sheet glass, a work-table, a carriage arranged to travel in a straight path over said work-table and provided with a tool for scoring or scratching the top surface of the glass, a plurality of rollers arranged in the top surface of the table parallel to the path of travel of said carriage for facilitating the movement of the glass over the table and preventing the glass from being scratched, one of said rollers being arranged in such a position that it lies beneath the path of the scoring tool, and manually operated means under the control of the operator for moving said last-mentioned roller upwardly with relation to the work-table so as to exert upward pressure on the under side of the glass and thus cause it to break along the line where it is scored.

In testimony whereof I hereunto affix my signature in the presence of two witnesses, this twenty first day of March, 1913.

ALLAN P. WHITTEMORE.

Witnesses:
WELLS L. CHURCH.
GEORGE BAKEWELL.